United States Patent [19]

Sankey

[11] Patent Number: 4,702,526
[45] Date of Patent: Oct. 27, 1987

[54] HUB ASSEMBLY

[75] Inventor: Ivor G. Sankey, Sutton Coldfield, England

[73] Assignee: Hardy Spicer Limited, Birmingham, England

[21] Appl. No.: 845,690

[22] PCT Filed: Jul. 29, 1885

[86] PCT No.: PCT/GB85/00336
§ 371 Date: Mar. 17, 1986
§ 102(e) Date: Mar. 17, 1986

[87] PCT Pub. No.: WO86/01160
PCT Pub. Date: Feb. 27, 1986

[30] Foreign Application Priority Data
Aug. 2, 1984 [GB] United Kingdom ................ 8419783

[51] Int. Cl.$^4$ .................. B60C 23/18; B60B 35/14; B60B 27/00
[52] U.S. Cl. .................... 301/6 WB; 301/105 R; 384/277; 384/476
[58] Field of Search ......... 301/6 WB, 105 R, 124 R, 301/124 H, 126, 131; 180/258, 259; 384/277, 476

[56] References Cited

U.S. PATENT DOCUMENTS

| 2,403,397 | 7/1946 | Rankin | 384/476 X |
| 2,566,715 | 9/1951 | Bessiere | 384/476 |
| 2,714,538 | 8/1955 | Hornbostel | 384/476 |
| 4,493,388 | 1/1985 | Welschof et al. | 180/258 |

FOREIGN PATENT DOCUMENTS 2479382 10/1981 France .
2075635A 11/1981 United Kingdom .
2122724A 1/1984 United Kingdom .

Primary Examiner—David A. Scherbel
Assistant Examiner—Russell D. Stormer
Attorney, Agent, or Firm—O'Toole, Gerstein, Murray & Bicknell Marshall

[57] ABSTRACT

A hub assembly for a drivable wheel of a motor vehicle, with a hub member 10, a bearing assembly with an outer race 20 and an inner race 21, and a constant velocity universal joint with an outer member 16 and inner member 17, wherein torque is transmitted between the hub member and joint outer member through the intermediary of an element 23 of thermally insulating material. The arrangement is such that the thermally insulating element is loaded substantially only in compression, enabling the use of efficient thermal insulators.

3 Claims, 2 Drawing Figures

HUB ASSEMBLY

This invention relates to a hub assembly for a drivable wheel of a motor vehicle, the assembly comprising a hub member, e.g. in the form of a driving flange, adapted to have a wheel and a brake member, e.g. a disc, secured thereto, bearing means for rotatably supporting the hub member, and a constant velocity ratio universal joint by which the hub member can be driven.

Such hub assemblies have been manufactured and proposed with many different arrangements of components. Recently, much attention has been paid to so-called integrated hub assemblies, in which numbers of separate components are reduced by combining functions in one or more components. One problem which arises in such hub assemblies is that of transmission of heat generated during braking to the bearing means and universal joint, with consequent degradation of lubricant therein and accelerated wear of the parts. Integrated hub assemblies usually present an easier path for heat flow to the bearing means and universal joint. It is the object of the present invention to overcome or reduce this disadvantage.

According to the invention, I provide a hub assembly for a drivable wheel of a motor vehicle, comprising a hub member adapted to have a wheel and a brake member secured thereto, bearing means comprising an outer race adapted to be connected to a suspension component of the vehicle, an inner race supporting said hub member and rolling bearing elements therebetween, and a constant velocity ratio universal joint comprising inner and outer members and means for torque transmission while permitting relative articulation therebetween, wherein a torque transmitting connection between the hub member and one of said joint members is established through the intermediary of an element of a thermally insulating material. Preferably the element of thermally insulating material also provides thermal insulation between the hub member and bearing inner race.

In a hub assembly according to the invention, the inter-position of the element of thermally insulating material restricts the rate at which heat can be transferred from the hub member and associated brake member to the universal joint. It is not essential that such transfer of heat is completely prevented, since excessively high brake member temperatures are generally a relatively short lived occurance, and provided that heat transfer can be slowed down during the period of high brake temperatures this is usually adequate to protect the universal joint and bearing means.

Preferably said element of thermally insulating material is loaded substantially in compression in said torque transmission between the hub member and joint member. This enables materials such as some ceramics to be used, which have good insulation properties and compressive strength but are not so strong in shear or tension.

Preferably the thermally insulating element also provides insulation between the hub member and bearing inner race.

These and other features of the invention will now be described by way of example with reference to the accompanying drawings, of which:

Figure 1:
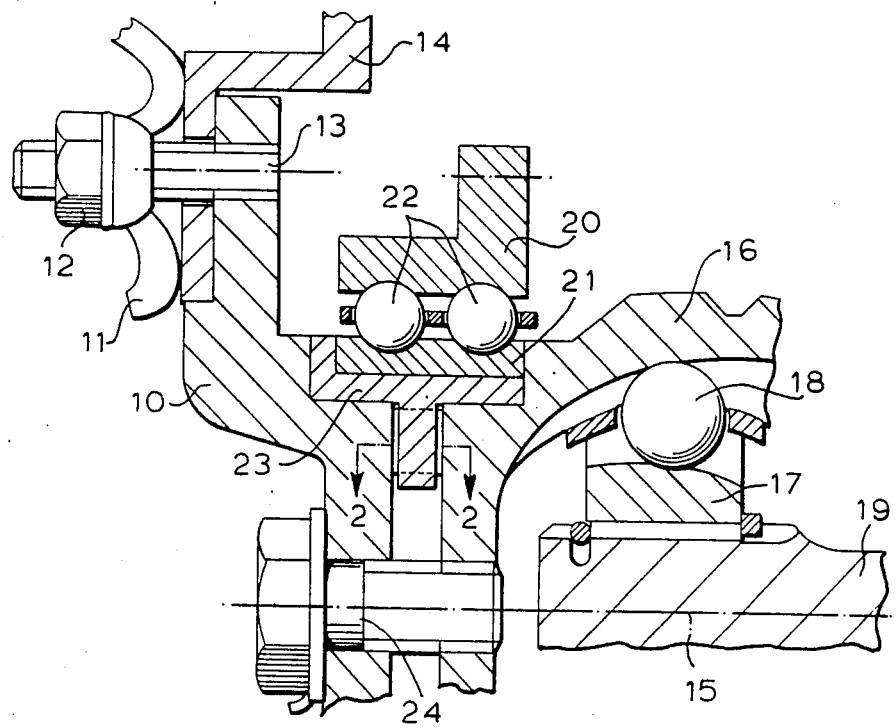
FIG. 1 is a diagrammatic section through part of a hub assembly according to the invention.

The illustrated hub assembly comprises a hub member in the form of a driving flange 10. In use it carries a wheel, part of which is shown at 11, secured thereto by a plurality of circumferentially distributed nuts 12 on studs 13. A brake disc 14 is secured to the hub member, being positioned on a flange portion of the hub member with the studs 13 extending through it, and held thereto by the wheel 11.

The hub assembly further comprises a constant velocity ratio universal joint of known type, which has an outer member 16, an inner member 17, and a plurality of circumferentially distributed torque transmitting balls 18 engaging in grooves in the inner and outer members. A splined end portion of the drive shaft 19 is received in a splined bore in the inner joint member 17. It will be appreciated that other types of universal joint may be utilised.

The hub assembly further comprises a bearing means with an outer race 20, inner race 21, and two rows of balls 22 therebetween. The outer race 20 is adapted to be secured to a suitable vehicle suspension component. The axis of rotation of the hub assembly is indicated at 15.

Figure 2:
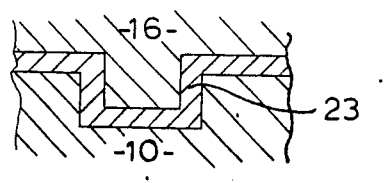
FIG. 2 is a part section on the line 2—2 of FIG. 1.

An annular member 23 of thermally insulating material is interposed between the hub member 10 and joint outer member 16. The hub member and outer joint member have parts which face one another and have formations, e.g. dogs, which inter-engage for torque transmission with the intermediary of the element of thermally insulating material, as shown in FIG. 2 of the drawings. The inner bearing race 21 is supported on an outer part of the element 23, such that it also is thermally insulated from the hub member 10. The assembly is held together by a single central bolt 24, extending through an aperture in hub member 10 and having screw-threaded engagement with joint outer member 16. As an alternative, the outer joint member may be provided with a stub shaft which extends into the hub member, and which has a threaded end portion for receiving a retaining nut.

It will be noted that the arrangement of the thermally insulating element 23 is such that it is stressed substantially only in compression during torque transmission between the hub member and joint outer member. This enables materials to be used for the thermally insulating element which may not have a particularly high strength in tension or shear, provided they are resistant to thermal shock, stable and strong in compression. This enables certain types of ceramic materials to be used. It is also contemplated that materials known as sialons, as supplied by Lucas Syalon Limited may be suitable.

Although a path for heat flow between the hub member and joint outer member is provided by the bolt 24, such heat flow is reduced compared with that which would be possible if there were direct contact between these members or if they were integral with one another. As above described, this greatly improves operating conditions for the joint member and bearing assembly.

I claim:

1. A hub assembly for a drivable wheel of a motor vehicle, comprising:
   a hub member;
   a brake member secured to said hub member;
   means for securing a wheel to said hub member;
   bearing means providing an axis of rotation and comprising an outer race having means for connecting it to a vehicle suspension component, an inner race and rolling bearing elements between said outer and inner races;

a constant velocity ratio universal joint comprising inner and outer members and means for torque transmission between said members and for permitting relative articulation therebetween;

one of said joint members being supported for rotation about said axis by said inner bearing race;

said hub member and said one joint member having surfaces facing one another along said axis and each having axially extending formations interfitting with the formations on the other member;

an element of a rigid thermally insulating material having a portion interposed between said surfaces and said interfitting formations;

fastening means holding said hub member and one joint member together with said element of thermally insulating material therebetween; and said element of thermally insulating material further comprising a portion providing thermal insulation between said hub member and said inner race.

2. A hub assembly for a drivable wheel of a motor vehicle, comprising:

a hub member;

a brake member secured to said hub member;

means for securing a wheel to said hub member;

bearing means providing an axis of rotation and comprising an outer race having means for connecting it to a vehicle suspension component, an inner race and rolling bearing elements between said outer and inner races;

a constant velocity ratio universal joint comprising inner and outer members and means for torque transmission between said members and for permitting relative articulation therebetween;

said hub member and said one joint member having surfaces facing one another along said axis and each having axially extending formations interfitting with the formation on the other member;

an element of a rigid thermally insulating material havng a portion interposed between said surfaces and said interfitting formations and a portion having an outwardly facing circumferential surface on which said inner bearing race is received, whereby both said joint member and inner bearing race are insulated from said hub member; and fastening means holding said hub member and one joint member together with said element of thermally insulating material therebetween.

3. A hub assembly according to claim 2 wherein said element of thermally insulating material is loaded substantially only in compression.

* * * * *